United States Patent
Pontoppidan

(10) Patent No.: US 6,267,307 B1
(45) Date of Patent: Jul. 31, 2001

(54) FUEL INJECTOR WITH ANTI-SCALE CERAMIC COATING FOR DIRECT INJECTION

(75) Inventor: Michaël Pontoppidan, Malmaison (FR)

(73) Assignee: Magneti Marelli France (FR)

( * ) Notice: Subject to any disclaimer, the term of this patent is extended or adjusted under 35 U.S.C. 154(b) by 0 days.

(21) Appl. No.: 09/581,324

(22) PCT Filed: Dec. 9, 1998

(86) PCT No.: PCT/FR98/02668

§ 371 Date: Jun. 8, 2000

§ 102(e) Date: Jun. 8, 2000

(87) PCT Pub. No.: WO99/31382

PCT Pub. Date: Jun. 24, 1999

(30) Foreign Application Priority Data

Dec. 12, 1997 (FR) .................................................. 97 15762

(51) Int. Cl.[7] .................. B05B 1/30; F02M 51/00
(52) U.S. Cl. .................. 239/585.4; 239/585.1; 239/584; 239/104
(58) Field of Search .................. 239/104, 533.2, 239/585.1, 585.4, 585.5, 900, 584

(56) References Cited

U.S. PATENT DOCUMENTS

| | | | |
|---|---|---|---|
| 4,007,880 | * 2/1977 | Hans et al. | 239/585.1 |
| 4,060,199 | * 11/1977 | Brune et al. | 239/585.4 |
| 4,218,021 | * 8/1980 | Palma | 239/585.4 |
| 4,266,729 | 5/1981 | Kulke et al. | |
| 4,592,506 | 6/1986 | Capes et al. | |
| 4,991,771 | 2/1991 | Porchet et al. | |

FOREIGN PATENT DOCUMENTS

| | | |
|---|---|---|
| 15 26 709 | 1/1966 | (DE) . |
| 0 151 793 | 12/1984 | (EP) . |
| 0 677 656 | 8/1994 | (EP) . |
| 0 790 404 | 2/1997 | (EP) . |
| 9112392 | 4/1997 | (JP) . |

OTHER PUBLICATIONS

Article "Comparative evaluation of high temperature coatings for corrosion protection of fuel injector tips"—pp. 153–167, by Mark Van Roode and Lulu Hsu.
Article "Ceramic coatings for corrosion environments"—pp. 1245–1259, by Marl Van Roode, Jeffrey R. Price, Richard E. Gildersleeve and Charles E. Smeltzer.

* cited by examiner

Primary Examiner—David A. Scherbel
Assistant Examiner—Steven J. Ganey
(74) Attorney, Agent, or Firm—Piper Marbury Rudnick & Wolfe

(57) ABSTRACT

The injector comprises a tip having at least one outlet orifice (7) for fuel delivered to an engine combustion chamber. A ceramic coating (14) is deposited on the external face of the tip, preferably in a kink (12) bounding a recess in this external face, at least around and immediately downstream of the outlet orifice (7) relative to the direction in which the fuel is delivered. This invention is applicable to fuel injectors with a ceramic coating to protect against deposits of carbon oil for use with spark-ignition and direct injection internal combustion engines.

8 Claims, 2 Drawing Sheets

Figure 4:
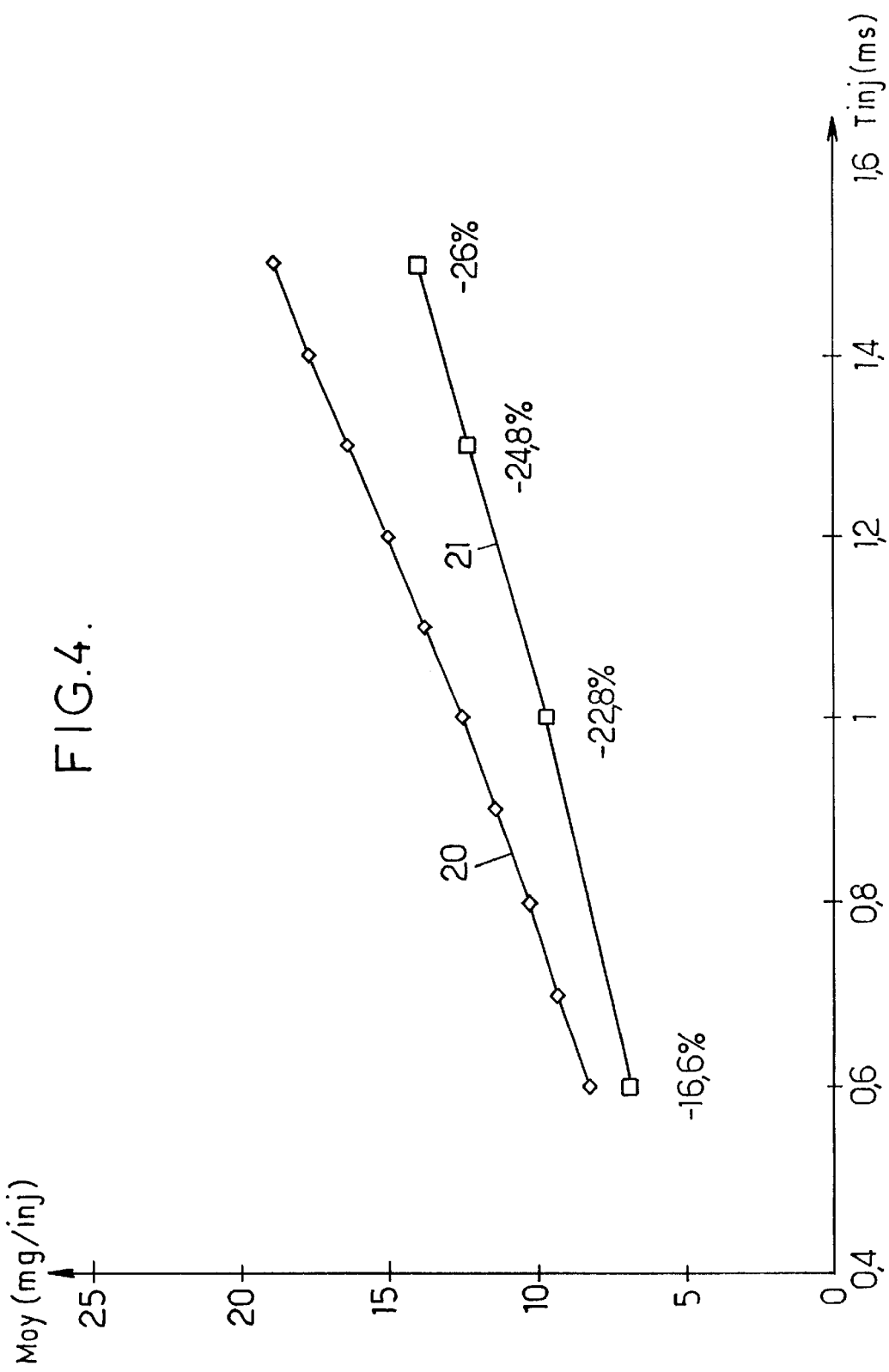

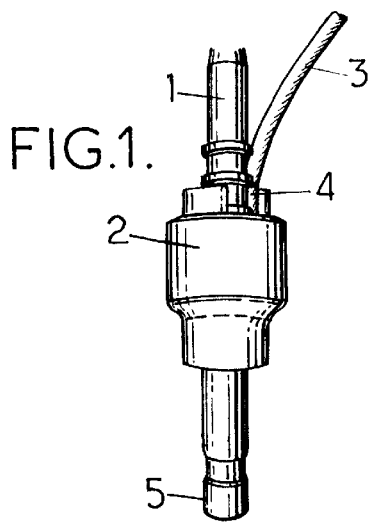
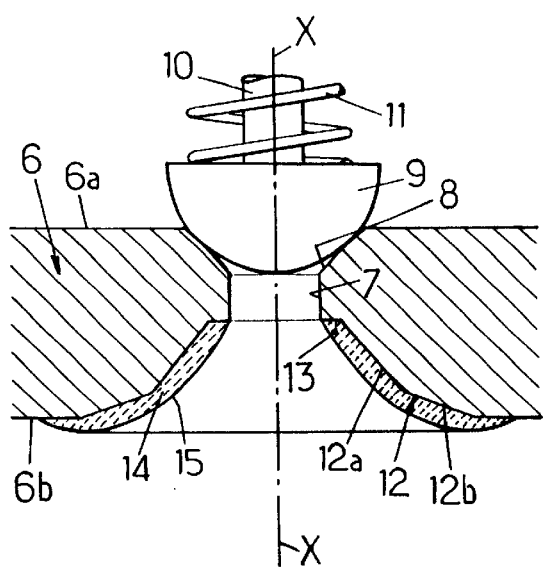
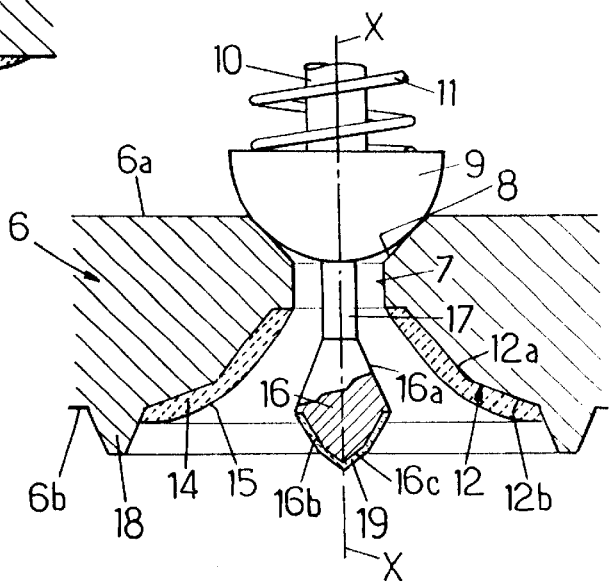

FUEL INJECTOR WITH ANTI-SCALE CERAMIC COATING FOR DIRECT INJECTION

The invention relates to fuel injectors for spark-ignition internal combustion engines in which the fuel is injected directly into the combustion chambers of the engine.

The invention relates to a fuel injector of the type in which the injector has a tip having at least one outlet orifice from which fuel enters an engine combustion chamber when the injector is in an open position and fuel is delivered to the outlet orifice, a movable throttle being moved back from a seat by actuating means against return means, generally resilient, which return the throttle to its seat and retain it against the latter when the injector is in a closed position.

Intermittently operated fuel injectors of this type are known in numerous designs and are used more particularly with diesel engines, in which the throttle forms part of a mobile assembly, sometimes referred to as a plunger, which, in an injector of the electromagnetic type, is displaced between closed and open positions by a power supply of a solenoid coil arranged in the body of the injector and moving the mobile assembly away from the throttle seat against at least one return spring, which closes the injector by applying the throttle against its seat as the electric supply is stopped.

If a fuel injector of the type described above is used in a system for injecting fuel directly into the combustion chambers of an engine, it is known that at least the tip of the injector opens directly into one combustion chamber. The injector is subjected to considerable stress as a result of this arrangement, in particular high stress due to heat during the combustion phases of the engine cycles.

In order to protect a fuel injector of a diesel engine against oxidation and corrosion during operation and in particular against cyclical oxidation and corrosion at temperatures which may be as much as 1000° C., it has been proposed that certain surfaces of the injectors should be covered with a ceramic coating, in particular in vitreous phase, or that certain components of the injector be made from wear-resistant materials or alternatively that the injector should be used in conjunction with complementary components made from these materials, for example ceramic or steel.

In particular, the article entitled "Comparative evaluation of high temperature coatings for corrosion protection of fuel injector tips" by MARK VAN ROODE and LULU HSU in "Surface and Coatings Technology", 32 (1987), pages 153 to 167, proposes that a high-performance coating be deposited on injector tips made from a nickel and chrome alloy by a physical vapour deposition process using an electron beam, in particular a ceramic in vitreous phase, to provide additional protection against deterioration due to oxidation and corrosion.

Also with a view to protecting injectors of a similar type against corrosion, U.S. Pat. No. 4,266,729 proposes that the tip of the mobile assembly forming the throttle and the disc or bead having the outlet orifice, which is simultaneously the calibration orifice in the injector design in question, be made from an anti-corrosion material such as steel, a ceramic or an industrial glass in order to prevent the outlet orifice from becoming clogged due to corrosion. U.S. Pat. No. 4,991,771 proposes using a pair of ceramic rings, one being arranged on each of the two sides of an injector outlet orifice in order to reduce corrosion or erosion. U.S. Pat. No. 4,592,506 proposes an injector with a cone-shaped pintle and an injection nozzle ring made from a wear-resistant ceramic material and EP-A-677 656 discloses a mobile assembly or injector plunger in which the plunger and plunger tip, forming the throttle, are made from a wear-resistant material such as a ceramic or appropriate metals, in particular steel, in order to withstand the wear, deformation and fatigue to which these components are subjected during service.

The designs outlined above which have components made totally from ceramic, either to replace metal components of earlier, more conventional designs or to co-operate with injectors of a conventional design, have the disadvantage of being expensive on the one hand and unsatisfactory in terms of metering stability on the other (alignment of outflow sections at the injector tips). In effect, it is impossible to position ceramic beads provided with orifices of the same diameter as the outlet and optionally calibrating orifices of the injector tips in perfect coaxial alignment with the outlet orifice.

Furthermore, these designs are intended to protect the injectors against corrosion and oxidation.

However, these designs are not suitable as a means of protecting petrol injectors used in direct injection systems against deposits of carbon oil which, depending on the position of the injector under specific conditions and the surface state of its tip opening into the combustion chamber, can lead to significant deterioration in the performance of the injector and can do so within a very short period of engine operation (approximately 20 hours).

In effect, when a direct-injection injector is closed, the output rate of the fuel is low which promotes a deposit of liquid fuel on the surface of the injector tip due to capillary action. Furthermore, since this surface is metal, it has a high electrochemical potential and, depending on the manufacturing process, a micro-structure with a not insignificant roughness. Modem fuels, in particular petrol, are of a complex chemical composition and contain numerous aromatic compounds. When the liquid fuel deposited on the surface of the injector tip is suddenly subjected to high temperature, either by the subsequent combustion phase or, when the engine is in a hot condition and is stopped, by internal thermal convection, this liquid fuel is caused to decompose by a cracking process, which after a short time of engine operation can lead to deposits of carbon oil on the surface of the injector tip reducing its performance, because, instead of emitting a regular jet of fuel into the combustion chamber, the jet is altered and its orientation may be sharply modified, and the delivery rate may be reduced, which disrupts preparation of the charge injected into the combustion chamber which in turn can lead to a serious and unacceptable degradation in combustion (combustion may fail or there may only be partial combustion, both of which will lead to unacceptable emission of noxious gases).

The problem underlying the invention is to propose a gasoline injector for a direct-injection system which is better suited than those disclosed in the prior art to the different requirements of practical operation, in particular with regard to protecting against contamination by carbon oil deposits, i.e. hydrocarbon residues, and to do so even if the injector is located close to an ignition plug in a combustion chamber.

In particular, the objective of the invention is to propose a gasoline injector which is protected to prevent changes in the fuel delivery rate characteristics and the geometry of the jets of atomised petrol which might result from deposits of hydrocarbon residues on the injector tip, given that, compared with a clean injector (one with no carbon oil deposit), an injector which has a deposit of carbon oil on the surface of its tip may deliver a petrol jet into the combustion chamber which is deflected and deformed, supplied at a rate which may be reduced by 25 to 35% depending on the injection duration, i.e. depending on the width of the electric pulse controlling an electromagnetic injector.

To this end, the gasoline injector proposed by the invention, of the type outlined above, is characterised in that it has a ceramic coating deposited on the external face of the tip, at least around and immediately downstream of its or each outlet orifice relative to the direction in which the gasoline is delivered.

Advantageously, immediately downstream of and around said outlet orifice or each one thereof, the external face of the tip has at least one kink bounding a recess in the external face of the tip and the ceramic coating is deposited at least in said recess.

Accordingly, a much smoother, much less heat-conductive and less electromagnetically active surface than the external surface of the metal tip of an injector is produced around each outlet orifice and downstream of this orifice, which external surface is specifically replaced by the external face of the ceramic coating of the injector proposed by the invention.

Advantageously, the ceramic coating also at least fills said recess, essentially in order to provide surface continuity between the wall of said outlet orifice and the external face of the ceramic coating and, preferably also between the external face of the ceramic coating and the external face of the tip downstream of said outlet orifice. The advantage of this surface continuity is that it avoids any disruption in the flow to the corresponding combustion chamber.

The injector may be of the type having a deflecting pintle, attached to the throttle and axially engaged in the outlet orifice, without being in contact with the wall of said orifice, and projecting out in a downstream direction from said orifice, in which case it is of advantage if the ceramic coating surrounds at least a part of the pintle without being in contact with it. In this embodiment, the pintle may also be at least partially coated with a layer of ceramic, particularly on its face or faces directed towards the interior of the combustion chamber.

The injector may also be of the type in which the external face of its tip has a peripheral ridge projecting downstream and surrounding said outlet orifice at a distance therefrom, in which case the ceramic coating advantageously extends from said outlet orifice at least as far as the base of said ridge.

By preference, the ceramic of the coating is a vitreous ceramic and this coating is applied by spraying or ceramic electrolytic deposition on the metal tip of the injector and optionally on the pintle.

The invention will be more readily understood and its other features and advantages clearer from the description of embodiments below, which is not restrictive in any respect, and with reference to the appended drawings, of which:

FIG. 1 is a schematic view in side elevation of a gasoline injector for a direction injection system in a spark-ignition engine, FIG. 2 is a partial view in axial section of an example of the injector illustrated in FIG. 1, FIG. 3 is a schematic view similar to that of FIG. 2 of a second example of an injector tip and FIG. 4 is a graph representing two curves plotting mean delivery rate (in mg per injection) as a function of the injection duration Tinj (in ms) for an injector with no carbon oil deposit as shown in the top curve and an injector contaminated by a deposit of fuel oil as shown in the bottom curve, after twenty hours of engine operation.

FIG. 1 is a schematic illustration of a gasoline injector for injecting gasoline directly into a combustion chamber of a spark-ignition engine. The injector is of the electromagnetic type which operates intermittently and comprises a tubular fuel delivery 1 opening into a body 2, which is tubular and houses in particular a solenoid coil supplied with an electric current by an electric conductor 3 connected to the injector by an electrical connector schematically illustrated by reference 4. The body 2 also houses a mobile assembly extending as far as the tip 5 of the injector, substantially in the extension of the fuel delivery 1 but on the side opposite the body 2 relative to this delivery 1.

As illustrated schematically in FIG. 2, the injector tip 5 has an end bead 6 having a single cylindrical orifice 7, which, in this design of injector, is simultaneously a calibrating orifice and an outlet orifice providing a passage for a pressurised gasoline jet from inside the tip 5 to the corresponding combustion chamber. This outlet and calibrating orifice 7 is connected to the flat face 6a of the bead 6 directed towards the interior of the tip 5, via a seat 8 of a truncated cone shape against which a throttle 9 is applied when the injector is in the closed position, this throttle 9 being in this example of a spherical dome shape, integral with the bottom end of a plunger of the mobile assembly inside the injector, this throttle 9 being pushed back towards its seat 8 by means of a compression spring 11 bearing against the injector body. When the injector coil is supplied, the plunger and the throttle 9 are displaced towards the interior of the injector, against the spring 11 which is compressed, moving the throttle 9 away from its seat 8 and allowing gasoline contained in the injector 1 to pass through the outlet orifice 7. Immediately downstream of this orifice 7, a kink 12 is machined into the external face 6b of the bead 6 and around the outlet orifice 7. In FIG. 2, the kink 12 is a kink staged in two parts having different slopes, the inner or top part 12a closer to the orifice 7 being coupled with the wall of the latter by means of a radial shoulder 13 whilst the outer or bottom part 12b of the kink 12 is coupled with the external face 6b of the bead 6.

As illustrated on the left-hand half of FIG. 2, a vitreous ceramic coating 14 is deposited in the recess defined by the kink 12 and, in the lower part 12b of this kink, the ceramic coating 14 becomes slightly thicker relative to the flat external face 6b of the bead 6. In the top part 12a of the kink 12, the ceramic coating 14 fills the recess thus formed so as to ensure surface continuity between the wall of the outlet orifice 7 and the external face 15 of the ceramic coating 14. This surface continuity does not disrupt the gasoline flow through the orifice 7 and downstream of the latter into the combustion chamber whilst the presence of the ceramic coating 14 around the outlet orifice 7 and in immediate proximity with this orifice as well as on the lower adjacent part of the injector tip 5 has the effect of protecting the injector against deposits of carbon oil or hydrocarbon residues on the external face of the injector tip 5.

In the example illustrated in FIG. 3, the same components and elements of the injector as those illustrated in FIG. 2 are shown by the same reference numerals.

The example illustrated in FIG. 3 differs from that of FIG. 2 in that the throttle 9 is axially extended (along the axis X—X of symmetry of the injector) by a deflection pintle 16, which is therefore axially disposed in the calibrating and outlet orifice 7, without being in contact with its wall, and projects axially beyond the outlet of this orifice 7. The pintle 16, attached to the throttle 9, is displaced with the latter in its axial reciprocating movements as the injector is opened and closed. The pintle 16 has a staged external face which is axisymmetrical about the axis X—X and has parts wit a truncated cone shape at the end of a small cylindrical rod 17.

One inner truncated cone part 16a, which is divergent in a downstream direction relative to the direction in which the gasoline is fed through the outlet orifice 7, bounds, in conjunction with the facing part of the ceramic coating 14 filling the upper or inner part 12a of the kink 12, an annular passage of a truncated cone design which is divergent in a downstream direction, the effect produced thereby being to inject the gasoline via the orifice 7 in an atomised hollow cone.

Another difference in the injector tip illustrated in FIG. 3 compared with that of FIG. 2 is that the external face 6b of the bead 6 has a peripheral ridge 18, the cross section of which is substantially triangular and projects axially in a downstream direction, this ridge 18 surrounding the outlet orifice 7 at a distance therefrom and being, in this example, substantially on a level with the point where the bottom or outer part 12b of the kink 12 adjoins the external face 6b of the bead 6.

In this example, the ceramic coating 14 extends from the shoulder adjoining the outlet office 7 as far as the base of the ridge 18, filling the recess bounded by the top or inner 12a and bottom or outer 12b parts of the kink 12. However, as with the example illustrated in FIG. 2, the external surface 15 of the ceramic coating 14 forms a line of continuity with the wall of the outlet orifice 7 down as far as the ridge 18.

In addition, the outer conical or truncated conical parts 16b and 16c of the outer face of the pintle 16 may also be protected by a ceramic coating 19 forming a line of surface continuity with the inner truncated cone part 16a of this pintle 16.

As a variant to the example illustrated in FIG. 3, the injector might have a deflection pintle such as that shown by 16 but might not have the ridge 18.

In FIGS. 2 and 3, the ceramic coating(s) 15 and/or 19 is or are deposited by spraying or by electrolytic deposition in a limited zone of the external surface of the injector tip, this limited zone still being immediately downstream of the outlet orifice, and around this orifice so that the ceramic coating is particularly effective in preventing any carbon oil from being deposited, which would disrupt the delivery rate characteristics and geometry of the gasoline jets injected into the combustion chamber.

FIG. 4 shows the mean delivery rate Moy of an injector in mg of gasoline injected per injection as a function of the time during which the injector is open or injection duration Tinj, in ms, for a controlled injection at a pressure of 8 MPa. The top curve 20 plotting measurement points shown by lozenges is the curve obtained for an injector with a ceramic coating whilst the bottom curve 21 plotting the measurement points shown by squares is the curve obtained using the same injector without a ceramic coating and thus having a deposit of carbon oil, after twenty hours of injector operation in each case. The drop in delivery performance is indicated for each of the four measurement points on the bottom curve 21 and varies from 16.6% to 26%.

This provides a clear indication of the potential contribution which the ceramic coating proposed by the invention can make to preserving the initial characteristics of a gasoline injector in a direct injection system over time.

Clearly, the invention may also be applied to gasoline injectors in which the gasoline outlet orifice or orifices is or are downstream of the calibration orifice or orifices relative to the gasoline delivery direction because of the structure of the injector. In this case, a ceramic coating is deposited on the external face of the injector tip at least around and immediately downstream of the outlet orifice or orifices.

What is claimed is:

1. A fuel injector for a direct-injection internal combustion engine, the fuel injector comprising: a tip having at least one outlet orifice from which gasoline enters an engine combustion chamber when the injector is in an open position and gasoline is delivered to the outlet orifice, a movable throttle being moved back from a seat by actuating means against return means, which return the throttle to its seat and retain it against said seat when the injector is in a closed position, and immediately downstream of and around said outlet orifice relative to the direction in which the gasoline is delivered, the external face of the tip has at least one kink bounding a recess in the external face of the tip and in that a coating of ceramic is deposited at least in said recess.

2. A fuel injector according to claim 1, wherein said ceramic coating at least fills said recess, essentially in order to provide surface continuity between the wall of said outlet orifice and the external face of said ceramic coating and, preferably also between the external face of said ceramic coating and the external face of the tip downstream of said outlet orifice.

3. A fuel injector according to claim 2, further comprising a deflection pintle, attached to the throttle and axially engaged in said outlet orifice, without being in contact with the wall of said orifice, and projecting out in a downstream direction from said orifice, the ceramic coating surrounding at least a part of said pintle without being in contact therewith.

4. A fuel injector according to claim 3, wherein said pintle is at least partially coated with a ceramic coating.

5. A fuel injector according to claim 1, wherein the external face of the tip of the injector has a peripheral ridge projecting downstream and surrounding said outlet orifice at a distance therefrom, and the ceramic coating extends from said outlet orifice at least as far as the base of said ridge.

6. A fuel injector according to claim 1, wherein the ceramic of said coating is a vitreous ceramic.

7. A fuel injector according to claim 1, wherein the ceramic coating is formed by a process of ceramic deposition by spraying on the metal tip of the injector.

8. A fuel injector according to claim 1, wherein the ceramic coating is formed by electrolytic ceramic deposition on the metal tip of the injector.

* * * * *